…

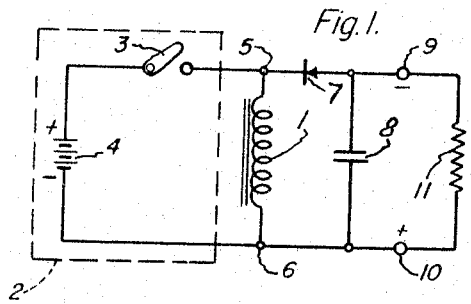
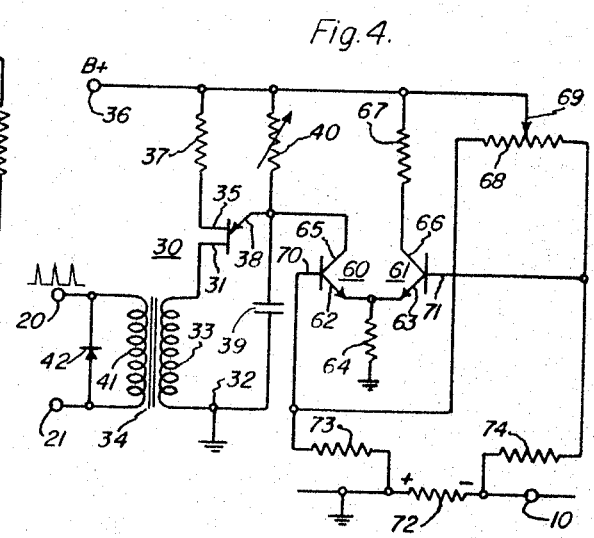
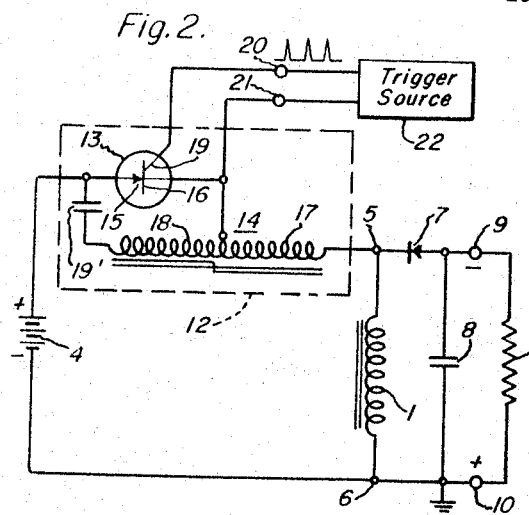
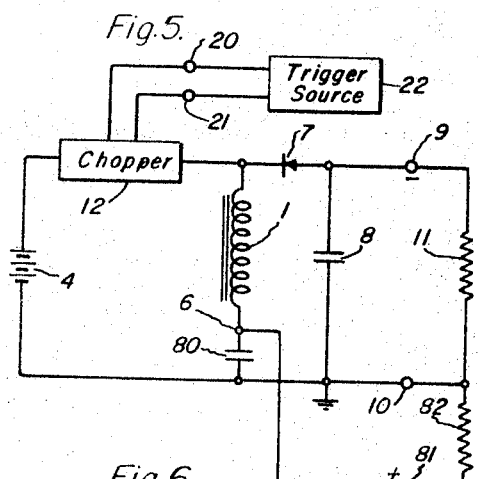
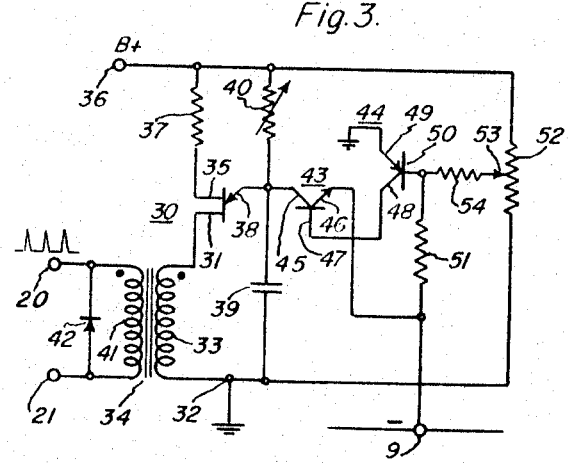
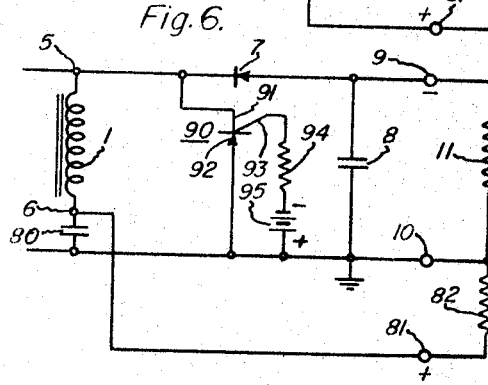
Inventor:
Jerome J. Tiemann,
by John F. Ahern
His Attorney.

United States Patent Office 3,320,511
Patented May 16, 1967

3,320,511
POLARITY INVERTING D.C. TO D.C. CONVERTER
Jerome J. Tiemann, Burnt Hills, N.Y., assignor to General Electric Company, a corporation of New York
Filed Dec. 12, 1963, Ser. No. 330,059
10 Claims. (Cl. 321—2)

The present invention relates to electrical D.C. to D.C. converters and more particularly pertains to such a converter wherein the output voltage is of opposite polarity from the input voltage and is readily adapted to provide an output voltage having a magnitude which can be equal to or markedly different in magnitude from the input voltage.

It is frequently desirable, and oftentimes necessary, to provide, from a source of unidirectional voltage of one polarity, a source of unidirectional voltage of the reverse polarity. This need arises, for example, when it is desired to use a particular semiconductive device that requires a source of voltage of one polarity and the only source available is of opposite polarity.

Oftentimes there is a demand not only for a source of unidirectional voltage having an inverted polarity from the polarity of a given source of unidirectional voltage, but also it is desired that the magnitude of the voltage of the resulting source be substantially different from the magnitude of voltage that is available. It is known that, unlike alternating current, this cannot be achieved with direct current by a transformer. A final demand is frequently that the source of inverted voltage be regulated, or maintained substantially constant at a predetermined given magnitude of current or voltage output. The two principal types of regulators commonly used for this purpose are the shunt regulator and the series regulator. These names are derived from the position of the primary current-controlling device with respect to the output terminals of the regulator. It is known that the former is inefficient when the output power drops well below a particular design value and the latter is inefficient when the output power exceeds substantially a predetermined design value.

Accordingly, it is an object of this invention to provide a polarity inverting D.C. to D.C. inverter.

It is another object of this invention to provide a polarity inverting D.C. to D.C. converter wherein the magnitude of output voltage can vary substantially from the magnitude of input voltage.

Still another object of this invention is to provide a polarity inverting D.C. to D.C. converter featuring an efficiently regulated output voltage or current that can be substantially different from the input voltage or current.

Briefly, in accordance wtih the preferred embodiment of this invention I provide an inductor, charging means adapted to periodically energize the inductor from a source of direct current, and a capacitor and diode connected in series circuit relationship in parallel with the inductor. The diode is connected to oppose charging of the capacitor during the intervals when the inductor is being energized from the source of unidirectional current. The capacitor is selected to exhibit a sufficiently high magnitude of capacitance so that the period of the natural resonant frequency of the capacitor and inductor and the time constant of the capacitor and a resistor having resistance value equal to the resistance of the smallest output resistance to be served are both long relative to the period of the energizing cycle of the inductor. In this way the output voltage, which is taken across the capacitor, is controlled by varying the duty cycle (ratio of the interval during which the charging means energizes the inductor to the total period of operation of the charging means). The duty cycle determines the magnitude of polarity inverted voltage supplied to a given apparatus to be electrically energized. By providing means to vary the duty cycle inversely as changes in the output voltage or current from a selected magnitude, efficient regulation of the output voltage or current is achieved.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings wherein similar components have like designations and in which:

FIGURE 1 is a simplified schematic circuit diagram useful in explaining the operation of the present invention;

FIGURE 2 is a schematic circuit diagram of a D.C. to D.C. converter in record with the present invention;

FIGURE 3 is a schematic circuit diagram of a trigger source for voltage regulating the converters of my invention;

FIGURE 4 is a schematic circuit diagram of a trigger source for current regulating the converters of my invention;

FIGURE 5 is a schematic circuit diagram of an alternative embodiment of a D.C. to D.C. converter in accord with my invention; and, FIGURE 6 is a schematic circuit diagram of yet another embodiment of a D.C. to D.C. converter in accord with the invention.

The simplified schematic circuit diagram of FIGURE 1 is presented to aid explanation of the principle of operation of the various embodiments of my invention. An inductor 1 is provided and charging means for the inductor is shown enclosed within the confines of dashed line block 2. The charging means is adapted to periodically energize the inductor from a source of unidirectional current and is illustrated schematically as comprising a switch 3 and battery 4 connected in series circuit relationship across terminals 5 and 6 of inductor 1. An asymmetrically conducting device, as diode 7, and capacitor 8 are connected in series circuit relationship in parallel with inductor 1. Because diode 7 is an asymmetrically conducting device it offers a great resistance to current in one direction and readily permits current to pass through it in the opposite direction. Diode 7 is connected to electrically isolate capacitor 8 from inductor 1 and battery 4 when switch 3 is closed and inductor 1 is being energized from battery 4. In the event that terminal 5 of inductor 1 is of positive polarity with respect to terminal 6 thereof, during the interval when the inductor is being energized by the charging means, the cathode of diode 7 is connected to terminal 5, as illustrated. When inductor 1 is energized by a source of unidirectional current that renders terminal 5 negative with respect to terminal 6, the aforementioned diode connections are reversed.

A useful output is obtained from output means connected to the capacitor. In FIGURE 1 the output means take the form of terminals 9 and 10 that are connected to opposite plates of capacitor 8. The output means are adapted to be connected to an electrically energizable apparatus. The apparatus is schematically illustrated in FIGURE 1 by resistor 11 which has opposite extremities thereof connected to terminals 9 and 10, respectively.

In accord with my invention the inductance of inductor 1 is large enough so that its reactance at the operating frequency is at least twelve times larger than the ratio of the charging voltage divided by the average charging current. It is desirable to select inductor 1 to exhibit at least twice the inductance calculated from the aforementioned criterion, and preferably the inductance is selected to be approximately 10 times the minimum value given above.

The value of the average charging current ($\bar{I}$) can be determined readily to a good approximation from the relation $V_B \bar{I} \geq$ output power, where $V_B$ is the voltage of battery 4. Of course, inductor 1 is selected to have a rating at least equal to the maximum current that is to be circulated therein and must not saturate, or become ineffective, at current levels below this magnitude.

Capacitor 8 is selected to satisfy two criteria. First, the capacitance value must be sufficiently high so that the period of the natural resonant frequency of capacitor 8, in combination with inductor 1, is long relative to the longest period between cycles of operation of switch 3. By using semiconductive switching elements, as silicon controlled rectifiers and transistors, the switching period can be made extremely small to aid in satisfying this criterion, preferably by at least one order of magnitude (approximately a factor of 10). The second criterion is that the capacitance value of capacitor 8 be selected to be sufficiently high in magnitude so that the time constant of the circuit comprising capacitor 8 and resistor 11 is long relative to the period of operation of switch 3. By time constant it is intended to designate the product of the capacitance value of capacitor 8 and the resistance value of resistor 11. This product determines the time required for capacitor 8 to discharge through resistor 11 while changing in voltage from a given starting voltage to a voltage magnitude equal to $1/e$ times that magnitude, where $e$ is the base of the natural logarithms (approximately 2.7). The time constant is calculated using the lowest value of resistance that is to be exhibited by an electrically energized apparatus connected to terminals 9 and 10, in the event that the resistance value is subject to change. The longer that the time constant of capacitor 8 and resistor 11 is, relative to the period of operation of switching means 3, the smoother will be the resulting voltage waveforms appearing at output terminals 9 and 10. This time constant should exceed the longest period of charging by at least a factor of two and preferably be more than 10 times the longest period of charging of inductor 1.

To understand the operation of the circuit of FIGURE 1, first assume that switch 3 has been in the open position for a long period of time and no electrical current is present in any portion of the circuit. When switch 3 is closed, battery 4 supplies current to inductor 1, building up energy in inductor 1. Because diode 7 is connected to isolate capacitor 8 and resistor 11 from battery 4 when inductor 1 is being charged, capacitor 8 and resistor 11 are not energized and no current or voltage appears in these two elements. Thereafter, when switch 3 is opened, inductor 1 reverses the polarity of terminals 5 and 6. An electrical current is then present in the loop consisting of inductor 1, the parallel connected capacitor 8 and resistor 11, and diode 7 because the latter is now heavily conductive and exhibits a low resistance to current therethrough. The polarity of the voltage accumulated by capacitor 8, during this portion of the cycle when switch 3 is open, is such as to render output terminal 9 negative with respect to output terminal 10.

Prior to the time when substantially all of the energy of inductor 1 would have been exhausted, switch 3 is again closed for an interval. Selecting capacitor 1 to satisfy the aforementioned two criteria ensures that all of the energy of inductor 1 will not be exhausted when switch 3 recloses. Charging energy is received again by inductor 1 from battery 4 and diode 7 isolates capacitor 8 and resistor 11. This time, however, capacitor 8 maintains the voltage between terminals 9 and 10 substantially constant at the magnitude accumulated prior to closing switch 3. This is because of the long time constant of the circuit comprising capacitor 8 and resistor 11. Thus, there is electric current in resistor 11 even though it is isolated from inductor 1 and battery 4. Thereafter, when switch 3 is again opened inductor 1 again supplies energy to capacitor 8 and resistor 11, increasing the magnitude of voltage accumulated by the former. In this way the output voltage between terminals 9 and 10 increases in increments as switch 3 is periodically opened and closed until the output voltage rises to that magnitude at which the power dissipated in resistor 11 plus the power lost in the converter circuit is equal to the power supplied by battery 4 to inductor 1 during the charging intervals. The power lost in reactance elements, as inductor 1 and capacitor 8, can be made extremely small by selecting devices of low equivalent resistance and the power lost in diode 7 and switch 3 can be made extremely low by selecting devices having low forward resistance.

For a given battery voltage the power supplied to inductor 1 changes in the same direction as variations in the duty cycle of switch 3. The duty cycle as used herein is equal to the ratio of the time during which switch 3 is closed to the total time for a charging cycle that includes both the closed interval and open interval of switch 3. Thus, as the duty cycle of switch 3 is increased the energy supplied to inductor 1 increases and the voltage appearing between output terminals 9 and 10 also increases to provide increased power dissipation in resistor 11 that is substantially equal to the power delivered by the charging means comprising battery 4 and switch 3. Conversely, when the duty cycle of switch 3 is decreased the voltage between output terminals 9 and 10 decreases. Thus, the output voltage of the converter changes in response to variations of the duty cycle of switch 3.

The important features of the circuit of FIGURE 1 are as follows. First the output power delivered by the converter readily can be made constant by fixing the cycle of switch 3. Alternatively, an upper limit for the duty cycle of switch 3 can be established to provide protection for the source of charging energy for inductor 1, to protect an electrically energizable apparatus connected to the output means of the converter from destruction, or both. Second, the voltage between the output terminals of the converter is regulated to maintain a substantially constant level of output voltage by providing means responsive to variations in the output voltage from a predetermined magnitude that effects variations in the opposite direction in the duty cycle of switch 3. Third, the output current from the converter is regulated at a substantially constant predetermined magnitude by providing means responsive to current deviations from the predetermined magnitude that effect a variation of the duty cycle of switch 3 in the opposite direction. The foregoing features will be pointed out with greater particularity in the following discussion of specific examples of converters comprising the various embodiments of my invention.

The schematic circuit diagram of FIGURE 2 illustrates a preferred embodiment of my invention wherein switch 3 of FIGURE 1 is replaced by a solid state device switching circuit, included within the confines of dashed line 12, and a suitable trigger source 22 connected thereto for initiating a switching cycle. The solid state switch includes a silicon controlled rectifier (SCR) 13 and saturable core inductor 14. In FIGURE 2 anode 15 of silicon controlled rectifier 13 is connected to the positive terminal of battery 4 and cathode 16 of silicon controlled rectifier 13 is connected to terminal 5 of inductor 1 by the primary winding 17 of inductor 14. Secondary winding 18 of transformer 14 is connected in series with capacitor 19′ from cathode 16 to anode 15. Gate electrode 19 of SCR 13 and cathode 16 thereof are connected to a pair of readily accessible terminals 20 and 21, respectively. Trigger source 22 is connected to terminals 20 and 21 and is adapted to render terminal 20 positive with respect to terminal 21 periodically.

The operation of the solid state switch enclosed within dashed line 12 is well-known to those skilled in the art. Such a switch is frequently referred to as a Morgan circuit. A detailed description and explanation of the Morgan circuit is to be found in the Silicon Controlled Rectifier Manual, Second Edition, published by the Semiconductor Products Department of the General Electric Company, particularly commencing at page 149 therein. In the interest of brevity, the lengthy discussion in that publication, that is incorporated by reference herein, will not be repeated.

Briefly, operation of the Morgan circuit is as follows. When terminal 20 is momentarily rendered positive with respect to terminal 21, as a result of a pulse delivered by trigger source 22, SCR 13 is switched to its highly conductive or "on" condition. Battery 4 then charges inductor 1 through the circuit including SCR 13 and primary winding 17 of inductor 14. The charging continues until transformer 14 saturates, at which time secondary winding 18 and capacitor 19' commutate, or reverse the polarity across silicon controlled rectifier 13. The silicon controlled rectifier then returns to its high impedance, or "off" condition. The silicon controlled rectifier remains substantially non-conductive until another initiating pulse is received from trigger source 22.

The interval during which SCR 13 remains conductive is substantially fixed by the time required for transformer 14 to saturate. Thus, the duty cycle, referred to above, is essentially determined by the frequency with which pulses are provided by trigger source 22. If the period of the pulses from trigger source 22 is long relative to the conduction intervals of SCR 13, the duty cycle will be correspondingly small. Conversely, as the period between triggering pulses approaches in duration the interval during which SCR 13 conducts the duty cycle will approach its largest magnitude, which is equal to one. As mentioned in connection with the circuit of FIGURE 1, the duty cycle of the switching means determines the power supplied to resistor 11. Thus, as the frequency of operation of trigger source 22 is increased more power is supplied to resistor 11 and conversely when the frequency of pulses is decreased less power is supplied to resistor 11.

FIGURE 3 is a schematic circuit diagram of a specific trigger source that is advantageously used with a circuit such as shown in FIGURE 2 in order to provide a voltage regulated converter. The trigger source comprises a unijunction transistor 30 having base one 31 connected to ground potential point 32 by primary winding 33 of pulse transformer 34. Base two 35, of unijunction transistor 30, is connected to a suitable source of positive voltage to which terminal 36 is adapted to be connected by resistor 37. Terminal 36 can be connected directly to the positive terminal of source 4, in FIGURE 2, in many cases. Emitter 38, of unijunction transistor 30 is connected to ground by capacitor 39 and to terminal 36 by variable resistor 40.

The circuit thus far described operates in a well-known manner that is described in detail in the Silicon Controlled Rectifier Manual, Second Edition, published by the Semiconductor Products Department of the General Electric Company, particularly commencing at page 46 thereof. Accordingly, the detailed explanation contained in this publication, that is incorporated by reference thereto herein, will not be repeated. Briefly, when capacitor 39 charges through resistor 40 to a voltage that is substantially equal to one half of the voltage difference between base two 35 and base one 31, unijunction transistor 30 "fires," or becomes highly conductive, discharging the energy of capacitor 39 to ground through primary winding 33 of pulse transformer 34. Upon such occurrence a pulse is induced in secondary winding 41 of pulse transformer 34, driving terminal 20 positive with respect to terminal 21. Diode 42 is connected to permit terminal 20 to only assume positive potentials with respect to terminal 21.

It will be recalled that causing terminal 20 to assume a positive potential with respect to terminal 21 is the necessary condition for firing SCR 13 of FIGURE 2. The portion of the circuit thus far described in connection with FIGURE 3 can be used directly as trigger source 22 in the arrangement of FIGURE 2. The repetition rate, or frequency with which pulses occur between terminals 20 and 21 is determined by the setting of resistor 40. High resistance values yield a low frequency of pulses and a reduction in resistance value yields an increased frequency of pulses.

In order to provide a voltage regulated D.C. to D.C. converter the trigger source is rendered responsive to the output voltage to provide variations in the frequency of triggering pulses in the opposite direction as changes in the magnitude of output voltage. This is advantageously accomplished by any of a plurality of voltage sensing circuits, although the remainder of the circuit of FIGURE 3 is particularly well suited for this purpose. The regulator includes two transistors 43 and 44. Transistor 43 is of the NPN type and its collector 45 is connected to emitter 38 of unijunction transistor 30. The emitter 46 of transistor 43 is connected to terminal 9, that is the negative output terminal of the converter as seen in FIGURE 2. Base 47 of transistor 43 is connected to collector 48 of transistor 44. The emitter 49 of PNP transistor 44 is connected to ground and base 50 thereof is connected through resistor 51 to terminal 9. A resistor 52 having a variable tap 53 thereon is provided with its extremities connected to terminals 36 and 32, respectively, and center tap 53 is connected to base 50 of transistor 44 by resistor 54.

In operation, adjustment of tap 53 of resistor 52 determines the magnitude of output voltage for the converter. This voltage is maintained until the maximum output power, as determined by the setting of variable resistor 40, is reached.

When terminal 9 becomes more negative with respect to grounded terminal 10, base 50 of transistor 44 assumes a more negative potential with respect to emitter 49 thereof and transistor 44 is rendered more highly conductive. When transistor 44 becomes more highly conductive, the current into base 47 of transistor 43 increases and transistor 43 also becomes more highly conductive. This, in turn, causes more current to be shunted through transistor 43 and away from capacitor 39, decreasing the rate of charging of capacitor 39. Thus, the frequency of output pulses at output terminals 20 and 21 of the trigger source decreases because fewer cycles are initiated by the cyclic charging and discharging of capacitor 39.

A reduction in the frequency of trigger pulses decreases the duty cycle of the switching means, as discussed in connection with FIGURE 2, and less power is supplied to output terminals 9 and 10 of the converter. Thus, the output voltage is reduced. In this way deviations of output voltage above a predetermined magnitude determined by adjustment of tap 53 are rapidly counteracted and the output voltage remains substantially constant. Conversely, when terminal 9 becomes less negative with respect to output terminal 10, the duty cycle is increased and the output voltage again is restored to its predetermined value.

FIGURE 4 is a schematic circuit diagram of a trigger source, suitable for use in a converter as illustrated in FIGURE 2, that features means to maintain a constant current output from the converter at a predetermined set magnitude. The unijunction transistor portion of the circuit of FIGURE 4 is similar to that of FIGURE 3 and similar components have the same identifying numerals. However, the trigger source of FIGURE 4 is adapted to be responsive to variations in the magnitude of output current from the converter to provide a change in the opposite direction in the frequency of triggering pulses appearing between terminals 20 and 21.

The current sensing portion of the circuit of FIGURE 4 can be any of a plurality of differential amplifier means, but preferably is of the variety shown wherein a pair of transistors 60 and 61 have their respective emitters 62 and 63 connected together and grounded through a single resistor 64. Both transistors are advantageously selected to be of the NPN type. The collector 65 of transistor 60 is connected to emitter 38 of UJT 30, and collector 66 of transistor 61 is connected to terminal 36 by resistor 67. A resistor 68 is provided having a variable tap 69 thereon that is connected to terminal 36. The respective extremities of resistor 68 are connected to base 70 of transistor 60 and base 71 of transistor 61.

In order to sense the magnitude of current supplied from converter output terminals 9 and 10, a resistor 72 is connected in series in the conductor supplying electrical energy to terminal 10. Resistor 72 acts as a current shunt and the voltage between its extremities is proportional to the magnitude of output current from the converter. Base 70 transistor 60 is connected through resistor 73 to the ground side of resistor 72 and base 71 of transistor 61 is connected by resistor 74 to the other end of resistor 72, which is connected to output terminal 10, as seen in FIGURE 2.

Operation of the circuit of FIGURE 4 is as follows. A maximum frequency of trigger pulses is set by adjusting resistor 40, as in the case of the circuit of FIGURE 3. Thereafter, tap 69 of resistor 68 is adjusted to provide a predetermined magnitude of output current. In FIGURE 4, movement of tap 69 to the left, or toward the base 70 side of resistor 68, reduces the output current. Movement of tap 69 in the opposite direction causes an increase of output current.

When the magnitude of current supplied by the converter exceeds the predetermined magnitude set by adjustment of tap 69, the delicate balance between differentially connected transistor 60 and 61 is upset and transistor 61 becomes more highly conductive. Upon such occurrence more current from resistor 40 is by-passed and less current is available to charge capacitor 39. Thus, the charging rate of capacitor 39 is reduced and the frequency of trigger pulses decreases to provide both reduced power available at the output terminals 9 and 10 of the converter and a reduction in current in any electrically energizable device connected thereto. Thus, the trigger source of FIGURE 4 is adapted to compensate for, or correct, deviations in the output current above the predetermined set magnitude. Conversely, when the output falls below the predetermined magnitude, transistor 60 becomes less conductive and more current is supplied from the output converter terminals. In this way the output current is maintained substantially at the predetermined set magnitude.

FIGURE 5 is a schematic circuit diagram of an alternative embodiment of my invention wherein the polarity inverted output voltage of the circuit of FIGURE 2 is obtained and in addition an output voltage is obtained having the same polarity as that of the source. This is accomplished by connecting capacitor 80 between terminal 6 of inductor 1 and ground, or the negative terminal of source 4. The additional output terminal 81 is connected to terminal 6 and supplies energy to any desired electrically energizable device, shown schematically as resistor 82. Capacitor 80 is selected to exhibit sufficient capacitance to satisfy the aforementioned criteria established for the minimum capacitance value of capacitor 8. Under this condition, operation of the circuit of FIGURE 5 is substantially identical to the operation of the circuit of FIGURES 1 and 2. Trigger source 22 can be either of the sources shown in FIGURES 3 and 4, depending upon whether output voltage or current is to be regulated. The power supplied to resistor 82 is substantially equal to the power supplied to resistor 11.

FIGURE 6 is a schematic circuit of a portion of the circuit of FIGURE 5 including means for supplying substantially unequal currents and/or voltages to the electrically energizable devices represented by resistors 11 and 82, and yet retain high efficiency of power conversion. This is accomplished in the circuit of FIGURE 6 by providing a silicon controlled rectifier 90 having cathode 91 thereof connected to terminal 5 of inductor 1 and anode 92 thereof connected to ground. Gate electrode 93 is connected to ground through a suitable protective resistor 94 and a source of negative reference voltage 95, that may be a battery as shown. In the circuit of FIGURE 6 it is assumed that the current supplied to resistor 82 is larger than the current supplied to resistor 11. In this case, the voltage of terminal 9 will seek a higher absolute magnitude, with respect to terminal 10 than will terminal 81. When the voltage across capacitor 8 exceeds the reference magnitude established by source 95, silicon controlled rectifier 92 becomes conductive, by-passing the current around capacitor 8 but through capacitor 80. In this way, the voltage and/or current supplied to resistor 82 can be many times greater than the current and/or voltage supplied to resistor 11 and yet maintain high efficiency conversion.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. A polarity inverting D.C. to D.C. converter comprising: an inductor; charging means adapted to periodically energize said inductor from a source of unidirectional current, said charging means including circuit means for regulating the period of operation of said charging means in accordance with an external control signal; a capacitor and an asymmetrically conducting device; conductive means connecting said capacitor and said device in series circuit relationship and in parallel with said inductor, said device being connected to electrically isolate said capacitor from said inductor during the intervals when said inductor is being energized by said charging means; and, output means connected to said capacitor and adapted to be connected to an electrically energizable apparatus having a predetermined minimum magnitude of resistance, said capacitor being selected to exhibit a sufficiently high magnitude of capacitance so that the period of the natural resonant frequency of said capacitor and said inductor and the time constant of said capacitor and a resistor having a resistance value equal to said minimum magnitude of resistance are both long relative to the longest period of operation of said charging means.

2. The converter of claim 1 wherein said period of the natural resonant frequency and said time constant are each longer than ten times the longest period of operation of said charging means.

3. The converter of claim 1 wherein said circuit means includes capacitor means, said converter further including a D.C. circuit between said electrically energizable apparatus and said capacitor means, and means responsive to voltage on said capacitor means for discharging said capacitor means each time the voltage on said capacitor means reaches a predetermined amplitude.

4. The converter of claim 2 wherein said inductor is selected to exhibit a reactance, at the frequency corresponding to the longest period of operation of said charging means, which is greater than twelve times larger than the ratio of the output voltage of said source of unidirectional current to the average charging current in amperes supplied by said source.

5. A polarity inverting D.C. to D.C. converter comprising: an inductor; charging means connected to said inductor and adapted periodically to connect said inductor to a source of unidirectional charging current, said charging means including circuit means for regulating the period of operation of said charging means in accordance with an external control signal; a capacitor and an asymmetrically conducting device connected together and in parallel circuit relationship with said inductor, said device being connected to oppose charging of said capacitor by the source of unidirectional charging current during the intervals when said inductor is periodically connected to the source of unidirectional charging current by said charging means, and said capacitor being selected to exhibit a sufficient magnitude of capacitance so that said capacitor in combination with said inductor provide a series resonant frequency that is lower than the frequency of periodic connections of said inductor to the source of unidirectional charging current by said charging means; and output means adapted to connect opposite terminals of said capacitor to an apparatus to be electrically energized.

6. The converter of claim 5 wherein said inductor is selected to exhibit a reactance, at the frequency of periodic connections of said inductor to said source, that is greater than twelve times the ratio of the average output voltage of said source during the charging intervals to the average charging current in amperes supplied to said inductor during said intervals.

7. The converter of claim 6 wherein said circuit means includes capacitor means, said converter further including a D.C. circuit between said apparatus to be electrically energized and said capacitor means, and means responsive to voltage on said capacitor means for discharging said capacitor means each time the voltage on said capacitor means reaches a predetermined amplitude.

8. A polarity inverting D.C. to D.C. converter comprising: an inductor; charging means adapted to periodically energize said inductor from a source of unidirectional current; a first capacitor connected in series circuit relationship with said inductor, said charging means and said source; a second capacitor and an asymmetrically conducting device; conductive means connecting said second capacitor and said device in series circuit relationship and in parallel with said inductor and said first capacitor; said device being connected to electrically isolate said capacitor from said source during the intervals when said inductor is being energized by said charging means; and, output means connected to said first and second capacitors, said capacitors being selected to provide a sufficiently high magnitude of capacitance so that the period of the natural resonant frequency of said capacitors and said inductor and the time constants of said capacitors and the equivalent resistance of any electrical apparatus connected to said output means are long relative to the longest period of operation of said charging means.

9. The converter of claim 8 wherein said inductor is selected to exhibit a reactance, at the frequency of periodic connections of said inductor to said source, that is greater than twelve times the ratio of the average output voltage of said source during the charging intervals to the average charging current in amperes supplied to said inductor during said intervals.

10. The converter of claim 9 including a switching device connected from the juncture of said capacitors to the juncture of said asymmetrically conducting device and said inductor, and means responsive to variations of the voltage across said second capacitor above a predetermined magnitude to initiate conduction of said switch.

References Cited by the Examiner

UNITED STATES PATENTS 2,817,803  12/1957  Hileman _____ 321—2
3,187,691   7/1965  Gilbert _____ 321—44 X JOHN F. COUCH, *Primary Examiner.*

W. H. BEHA, *Assistant Examiner.*